United States Patent
Nakayama et al.

(10) Patent No.: US 11,900,973 B2
(45) Date of Patent: Feb. 13, 2024

(54) DISK DRIVE SUSPENSION INCLUDING A DAMPER MATERIAL ATTACHED TO A LOAD BEAM AND TO AN OUTRIGGER OF A FLEXURE

(71) Applicant: NHK SPRING CO., LTD., Yokohama (JP)

(72) Inventors: Hiroshi Nakayama, Yokohama (JP); Masao Hanya, Yokohama (JP); Tatsuhiko Nishida, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/083,791

(22) Filed: Dec. 19, 2022

(65) Prior Publication Data
US 2023/0197110 A1    Jun. 22, 2023

(30) Foreign Application Priority Data
Dec. 20, 2021 (JP) ................. 2021-205870

(51) Int. Cl.
*G11B 5/48* (2006.01)
*G11B 33/08* (2006.01)

(52) U.S. Cl.
CPC .......... *G11B 5/4833* (2013.01); *G11B 5/4826* (2013.01); *G11B 33/08* (2013.01)

(58) Field of Classification Search
None
See application file for complete search history.

(56) References Cited

U.S. PATENT DOCUMENTS

| | | | |
|---|---|---|---|
| 6,967,821 B2 | 11/2005 | Himes et al. | |
| 7,336,444 B2 | 2/2008 | Kido et al. | |
| 10,991,388 B1* | 4/2021 | Yamada | G11B 5/4833 |
| 2010/0079915 A1 | 4/2010 | Kido | |
| 2020/0279579 A1* | 9/2020 | Nakayama et al. | G11B 5/4833 |
| 2021/0287698 A1* | 9/2021 | Yamada | G11B 5/4833 |

FOREIGN PATENT DOCUMENTS

| | | |
|---|---|---|
| JP | 2006221726 A | 8/2006 |
| JP | 2010086630 A | 4/2010 |

* cited by examiner

*Primary Examiner* — Craig A. Renner
(74) *Attorney, Agent, or Firm* — Holtz, Holtz & Volek PC

(57) ABSTRACT

According to an embodiment, a disk drive suspension includes a load beam, a flexure including a tongue on which a slider is mounted and an outrigger connected to the tongue, and overlapping the load beam, and a damper material attached to the load beam and the outrigger. Further, the damper material has a single-layer structure of a viscoelastic material.

8 Claims, 9 Drawing Sheets

DISK DRIVE SUSPENSION INCLUDING A DAMPER MATERIAL ATTACHED TO A LOAD BEAM AND TO AN OUTRIGGER OF A FLEXURE

CROSS-REFERENCE TO RELATED APPLICATIONS

This application is based upon and claims the benefit of priority from prior Japanese Patent Application No. 2021-205870, filed Dec. 20, 2021, the entire contents of which are incorporated herein by reference.

BACKGROUND OF THE INVENTION

1. Field of the Invention

The present invention relates to a disk drive suspension used for a hard disk drive, etc.

2. Description of the Related Art

For information processing devices such as personal computers, hard disk drives (HDD) are used. A hard disk drive includes a magnetic disk which rotates around a spindle and a carriage which pivots on a pivot. The carriage comprises an actuator arm and pivots on the pivot in the track width direction of the disk by a positioning motor such as a voice coil motor.

To the actuator arm described above, a disk drive suspension (hereinafter, simply referred to as a suspension) is attached. The suspension includes a load beam and a flexure provided so as to overlap the load beam. In a gimbal portion formed near the distal end of the flexure, a slider constituting a magnetic head is provided. In the slider, an element (transducer) for performing access such as data reading or writing is provided. These load beam, flexure and slider and the like constitute a head gimbal assembly.

The gimbal portion described above includes a tongue on which the slider is mounted, and a pair of outriggers formed on the both sides of the tongue. These outriggers have shapes extending to the external sides of the both side portions of the flexure. The vicinity of each end portion of each outrigger in the length direction is fixed to the load beam by, for example, laser welding. Each outrigger can be deformed in the thickness direction like a spring and has an important role to ensure the gimbal motion of the tongue.

To correspond to the increase in recording density of disks, it is necessary to further reduce the size of the head gimbal assembly and determine the position of the slider with respect to the recording surface of the disk with higher accuracy. To achieve this object, the oscillation of the flexure needs to be made as less as possible while ensuring gimbal motion required for the head gimbal assembly. For example, as described in U.S. Pat. No. 6,967,821 B2, JP 2006-221726 A and JP 2010-86630 A, to prevent the oscillation of a flexure, the provision of a damper material in part of a suspension is suggested.

By increasing the area to attach a damper material in the outriggers, the improvement of the effect of preventing oscillation can be expected. However, when this area is increased, the rigidity of the flexure also largely changes although the rigidity of the flexure is important for gimbal motion. In consideration of this matter, a damper material should be locally attached to the effective area of the outriggers to prevent oscillation. However, a common damper material has a multilayer structure of a soft viscoelastic layer and a rigid constrained plate (constrained layer). Since the constrained plate is difficult to deform, the attachable portion is limited. Thus, the realization of both the prevention of oscillation and a good rigidity for the flexure may be difficult.

BRIEF SUMMARY OF THE INVENTION

An object of the present invention is to provide a disk drive suspension which can effectively prevent the oscillation of a flexure and realize a good rigidity for the flexure.

In general, according to one embodiment, a disk drive suspension comprises a load beam, a flexure comprising a tongue on which a slider is to be mounted and an outrigger connected to the tongue, and overlapping the load beam, and a damper material attached to the load beam and the outrigger. Further, the damper material has a single-layer structure of a viscoelastic material.

The load beam comprises a first surface and a second surface on an opposite side of the first surface. The outrigger comprises a third surface at least partially facing the second surface, a fourth surface on an opposite side of the third surface, and a side surface connecting the third surface and the fourth surface. For example, the damper material is attached to each of the second surface, the fourth surface and the side surface.

The second surface may include a curved surface formed in an edge portion of the load beam. In this case, the damper material may be attached to the curved surface.

The damper material may be provided at a position at which the outrigger and the edge portion intersect as seen in plan view.

The flexure may comprise a distal end portion secured to the load beam. In this case, the damper material may be attached to the outrigger and the distal end portion, and may be also attached to, of the load beam, an area located between the outrigger and the distal end portion as seen in plan view.

The damper material comprises a fifth surface attached to the load beam and the outrigger, and a sixth surface on an opposite side of the fifth surface. The sixth surface may be exposed to atmosphere around the damper material.

A gap may be formed between the outrigger and the load beam at least in part of an area in which the load beam, the outrigger and the damper material overlap each other.

The damper material may be attached to each of the first surface and the third surface. In this case, the load beam may comprise an aperture which penetrates between the first surface and the second surface, and the damper material may be attached to the third surface through the aperture.

The present invention can provide a disk drive suspension which can effectively prevent the oscillation of a flexure and realize a good rigidity for the flexure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments will be described with reference to the accompanying drawings.

First Embodiment

Figure 1:
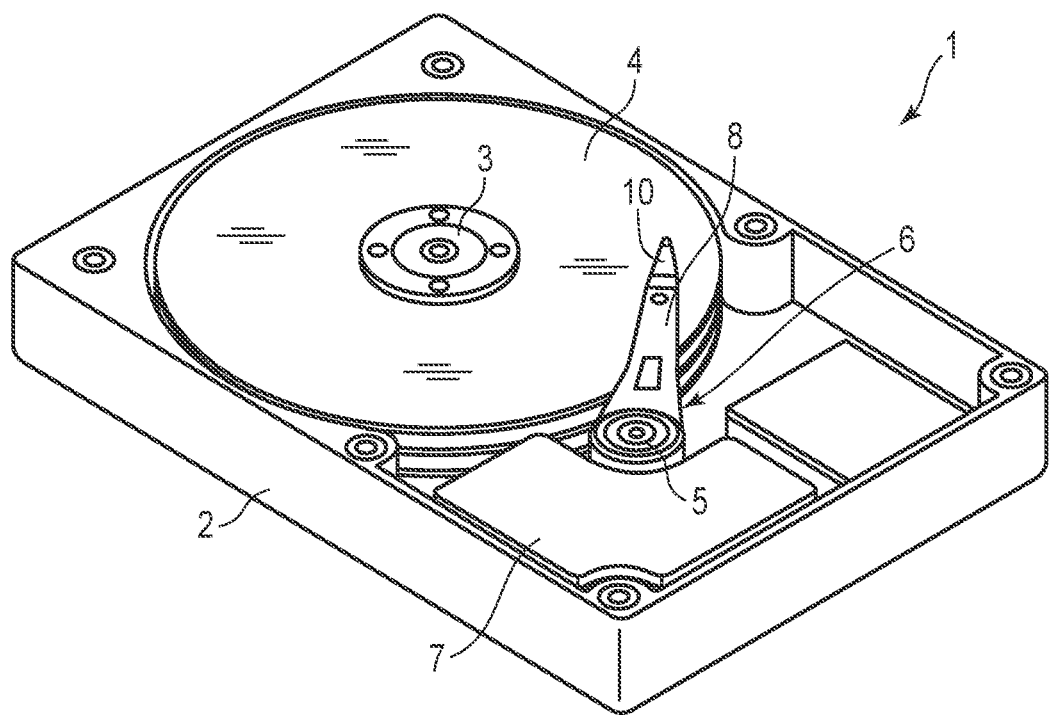
FIG. 1 is a schematic perspective view showing an example of a disk drive according to a first embodiment.

FIG. 1 is a schematic perspective view showing an example of a disk drive (HDD) 1. This disk drive 1 comprises a case 2, a plurality of disks 4 which rotate around a spindle 3, a carriage 6 which can pivot on a pivot 5, and a positioning motor (voice coil motor) 7 for driving the carriage 6. The case 2 is sealed by a cover (not shown).

Figure 2:
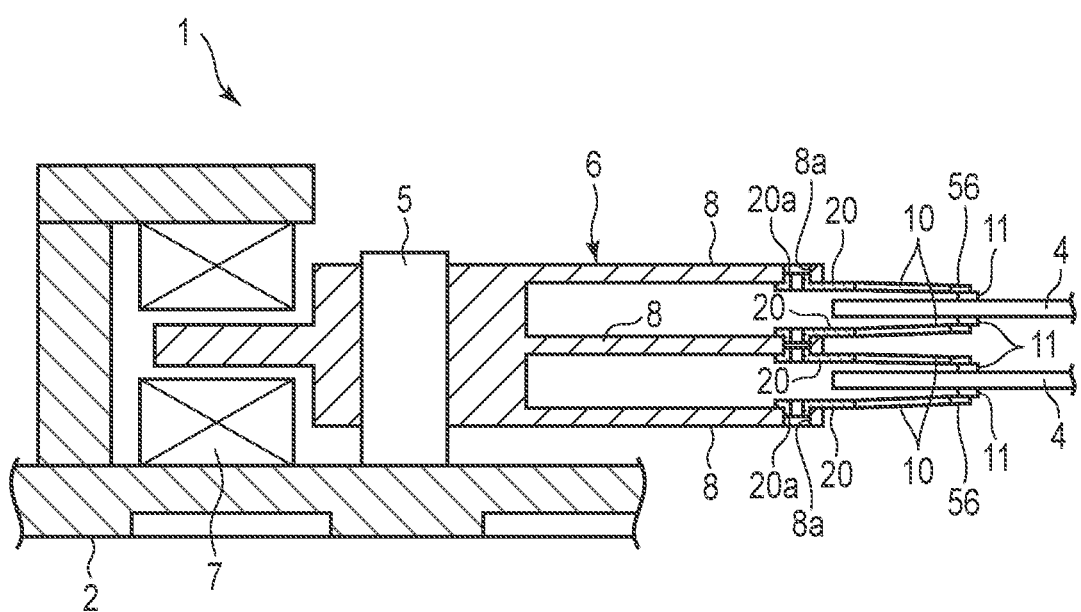
FIG. 2 is a schematic cross-sectional view showing part of the disk drive according to the first embodiment.

FIG. 2 is a schematic cross-sectional view showing part of the disk drive 1. As shown in FIG. 1 and FIG. 2, a plurality of arms (carriage arms) 8 are provided in the carriage 6. To the distal end portions of the arms 8, suspensions 10 are attached. Sliders 11 constituting a magnetic head are provided in the distal end portions of the suspensions 10. When the disks 4 rotate at high speed, air inflows between the disks 4 and the sliders 11, thereby forming an air bearing.

When the carriage 6 is caused to pivot by the positioning motor 7, the suspensions 10 move in the radial direction of the disks 4. Thus, each slider 11 moves to a desired track of the disk 4.

Figure 3:
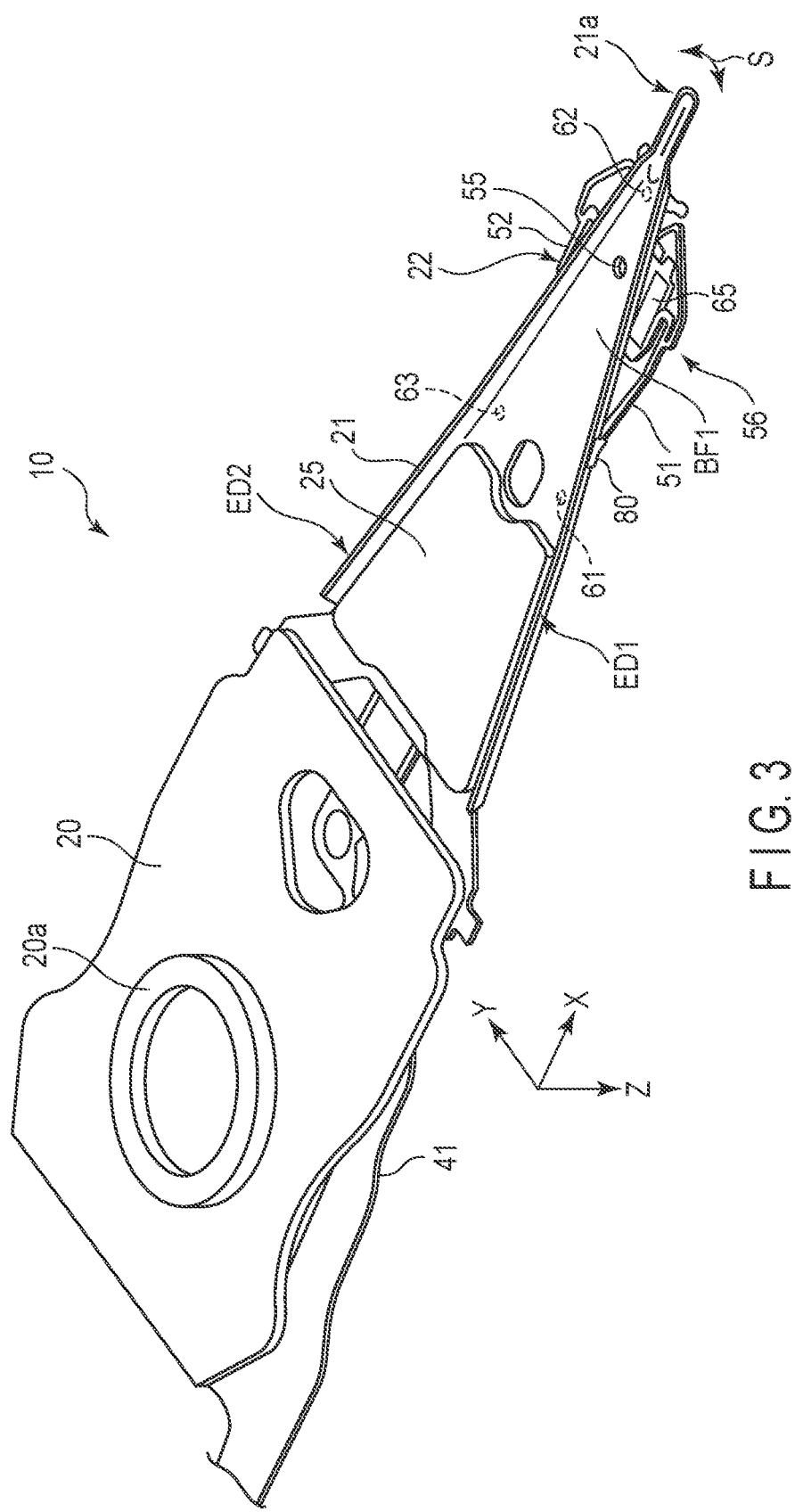
FIG. 3 is a schematic perspective view of a suspension according to the first embodiment.

FIG. 3 is a schematic perspective view of the suspension 10 according to the present embodiment. The suspension 10 comprises a base plate 20 secured to the arm 8 (shown in FIG. 1 and FIG. 2) of the carriage 6, a load beam 21, and a flexure 22. In the base plate 20, a boss portion 20a inserted into a hole 8a (shown in FIG. 2) formed in the arm 8 is formed. The flexure 22 is provided along the load beam 21.

In the following explanation, the length direction X, the width direction Y and the thickness direction Z of the suspension 10, the load beam 21 and the flexure 22 are defined as shown in FIG. 3. A sway direction S is defined as shown by the arcuate arrow near the distal end 21a of the load beam 21.

Figure 4:
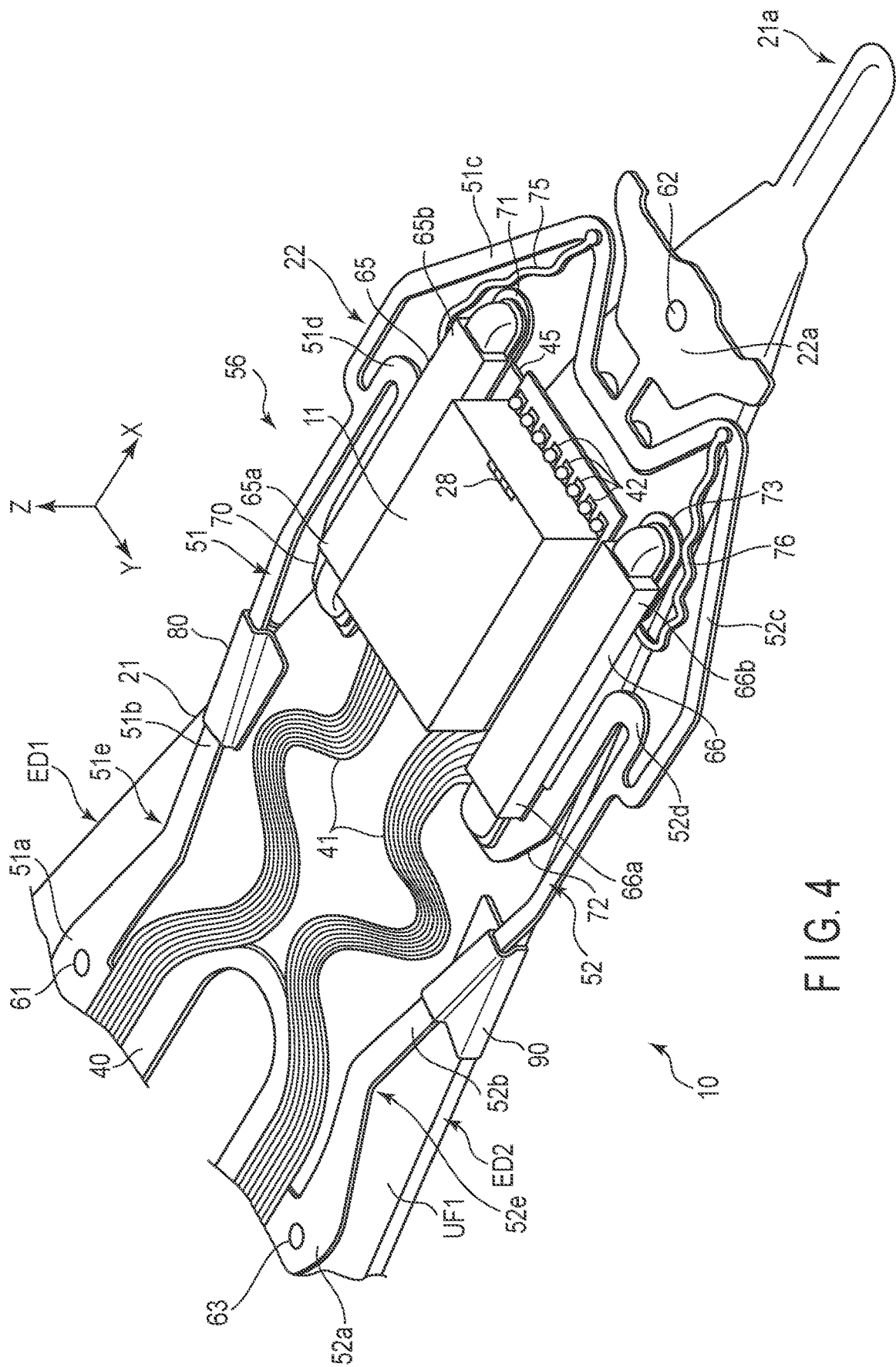
FIG. 4 is a schematic perspective view when part of the distal end side of the suspension is viewed from the slider side according to the first embodiment.

FIG. 4 is a schematic perspective view when part of the distal end side of the suspension 10 is viewed from the slider 11 side. The load beam 21 comprises a lower surface BF1 (first surface) shown in FIG. 3 and an upper surface UF1 (second surface) shown in FIG. 4. The upper surface UF1 is a surface on which the flexure 22 is provided. As shown in FIG. 3, a damper member 25 may be provided on the lower surface BF1.

The load beam 21 further comprises a pair of edge portions ED1 and ED2. The edge portions ED1 and ED2 incline with respect to the length direction X and the width direction Y. The distance between the edge portions ED1 and ED2 in the width direction Y is decreased toward the distal end 21a of the load beam 21. As shown in FIG. 3, in the present embodiment, the load beam 21 is bent so as to protrude to the lower surface BF1 side (such that the lower surface BF1 is the internal side) in the edge portions ED1 and ED2.

As shown in FIG. 4, elements 28 which can convert a magnetic signal into an electric signal such as MR elements are provided in the distal end portion of the slider 11 which constitutes the magnetic head. These elements 28 perform access such as data writing or reading with respect to the disk 4. The slider 11, the load beam 21, the flexure 22 and the like constitute a head gimbal assembly.

The flexure 22 comprises a metal base 40 formed of a thin stainless steel plate, and a pair of line portions 41 provided along the metal base 40. The line portions 41 are arranged in the width direction Y and extend in the length direction X while bending. The thickness of the metal base 40 is less than that of the load beam 21. The thickness of the metal base 40 should be preferably 12 to 25 μm, and is, for example, 20 μm. The thickness of the load beam 21 is, for example, 30 μm. Part of the line portions 41 is electrically connected to the elements 28 of the slider 11 via terminals 42 for the slider 11.

Figure 5:
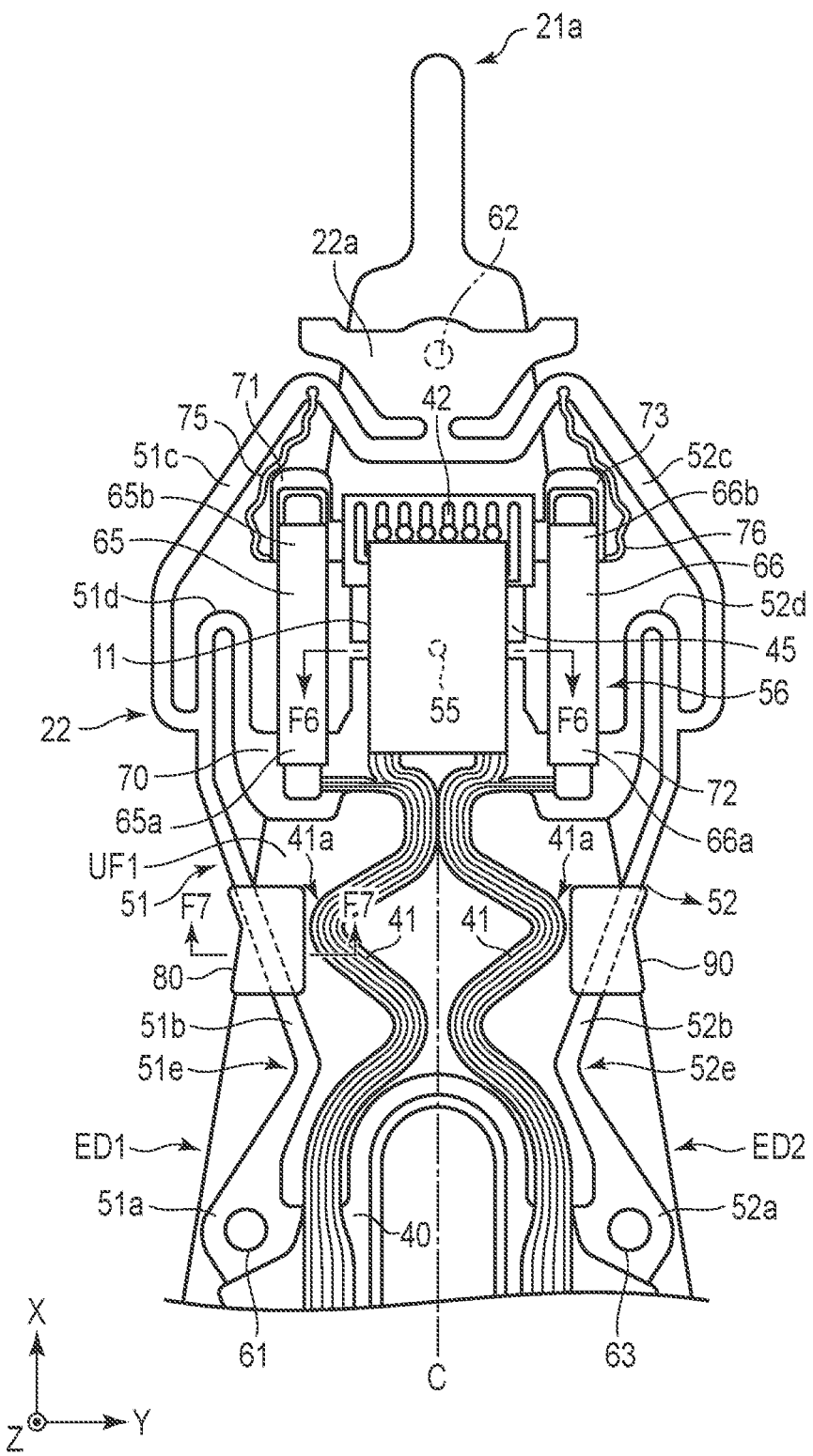
FIG. 5 is a schematic plan view when the vicinity of the distal end portion of the suspension is viewed from the slider side according to the first embodiment.

FIG. 5 is a schematic plan view when the vicinity of the distal end portion of the suspension 10 is viewed from the slider 11 side. The flexure 22 comprises a tongue 45, a first outrigger 51 and a second outrigger 52. The slider 11 is mounted on the tongue 45. The first outrigger 51 and the second outrigger 52 are provided on the both external sides of the tongue 45 in the width direction Y.

The first outrigger 51 and the second outrigger 52 have shapes extending to the both external sides of the tongue 45 in the width direction. Each of the tongue 45, the first outrigger 51 and the second outrigger 52 is part of the metal base 40. The outline of each of the tongue 45, the first outrigger 51 and the second outrigger 52 is formed by, for example, etching.

Figure 6:
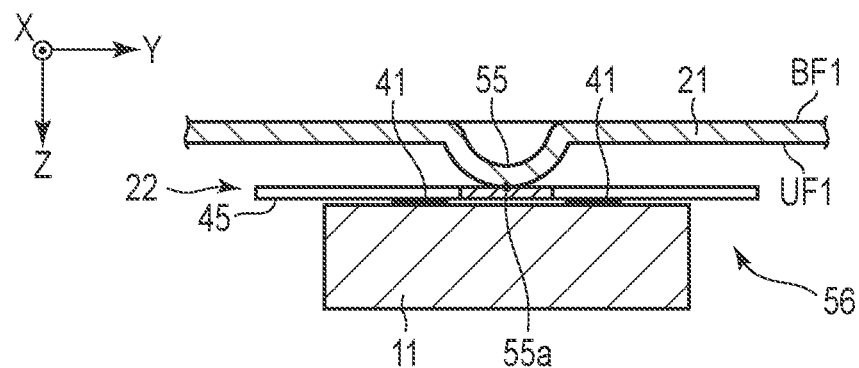
FIG. 6 is a schematic cross-sectional view of the suspension along the F6-F6 line of FIG. 5.

FIG. 6 is a schematic cross-sectional view of the suspension 10 along the F6-F6 line of FIG. 5. The load beam 21 comprises a dimple 55 which protrudes toward the tongue 45. The distal end 55a of the dimple 55 is in contact with the tongue 45. The tongue 45 sways based on the distal end 55a of the dimple 55 and is configured to perform desired gimbal motion. The tongue 45, the first outrigger 51, the second outrigger 52, the dimple 55 and the like constitute a gimbal portion 56.

As shown in FIG. 4 and FIG. 5, the first outrigger 51 is provided on the external side of a side portion of the tongue 45 and extends in the length direction X. The second outrigger 52 is provided on the external side of the other side portion of the tongue 45 and extends in the length direction X.

The first outrigger 51 comprises a first proximal end portion 51a, a first proximal end arm 51b, a first distal end arm 51c and a first connection portion 51d. The first proximal end portion 51a is secured to the load beam 21 by a securing portion 61. The first proximal end arm 51b extends from the first proximal end portion 51a to a side portion of the tongue 45. An end of the first distal end arm 51c is connected to the first proximal end arm 51b. The other end is connected to the distal end portion 22a of the flexure 22. The first connection portion 51d connects the distal end of the first proximal end arm 51b to a side portion of the tongue 45. The distal end portion 22a is secured to the vicinity of the distal end of the load beam 21 by a securing portion 62. The securing portions 61 and 62 are formed by, for example, laser spot welding.

The first proximal end arm 51b comprises a first bent portion 51e. Between the first proximal end portion 51a and the first bent portion 51e, the first proximal end arm 51b extends in a direction approaching the center C of the suspension 10 in the width direction Y. Between the first bent portion 51e and the first distal end arm 51c, the first proximal end arm 51b extends in a direction moving away from the center C.

The second outrigger 52 has a shape similar to that of the first outrigger 51. In other words, the second outrigger 52 comprises a second proximal end portion 52a, a second proximal end arm 52b, a second distal end arm 52c, a second connection portion 52d and a second bent portion 52e. The second proximal end portion 52a is secured to the load beam 21 by a securing portion 63 formed by, for example, laser spot welding.

As described above, the both end portions of the first outrigger 51 in the length direction X are supported by the securing portions 61 and 62. Further, the both end portions of the second outrigger 52 in the length direction X are supported by the securing portions 62 and 63. This structure allows the portion of the first outrigger 51 between the securing portions 61 and 62 and the portion of the second outrigger 52 between the securing portions 62 and 63 to deform in the thickness direction Z. In this way, the tongue 45 is elastically supported by the first outrigger 51 and the second outrigger 52 and can sway based on the dimple 55.

A first microactuator element 65 and a second microactuator element 66 are mounted on the gimbal portion 56. These microactuator elements 65 and 66 are formed of a piezoelectric material and are provided on the both sides of the slider 11 in the width direction Y. The both end portions 65a and 65b of the first microactuator element 65 are secured to the actuator supporting portions 70 and 71 of the tongue 45, respectively. The both end portions 66a and 66b of the second microactuator element 66 are secured to the actuator supporting portions 72 and 73 of the tongue 45, respectively.

The microactuator elements 65 and 66 comprise a function of rotating the tongue 45 in a sway direction S (shown in FIG. 3). In the example of FIG. 4 and FIG. 5, a limiter member 75 for preventing excessive oscillation of the tongue 45 is provided between a side portion of the tongue 45 and the first outrigger 51. In addition, a limiter member 76 is provided between the other side portion of the tongue 45 and the second outrigger 52.

As shown in FIG. 4 and FIG. 5, the suspension 10 comprises a first damper material 80 and a second damper material 90 for preventing the oscillation of the flexure 22. The first damper material 80 and the second damper material 90 are attached to the load beam 21 and the flexure 22.

Specifically, the first damper material 80 is attached to a range including the position at which the first proximal end arm 51b and the edge portion ED1 intersect as seen in plan view. The second damper material 90 is attached to a range including the position at which the second proximal end arm 52b and the edge portion ED2 intersect as seen in plan view.

The first damper material 80 is located between the first bent portion 51e and the first distal end arm 51c in the length direction X. The second damper material 90 is located between the second bent portion 52e and the second distal end arm 52c in the length direction X.

In the example of FIG. 5, the first damper material 80 covers, of the first proximal end arm 51b, the portion which protrudes from the edge portion ED1 (the portion which does not face the load beam 21) as seen in plan view in addition to the portion facing the load beam 21. Similarly, the second damper material 90 covers, of the second proximal end arm 52b, the portion which protrudes from the edge portion ED2 as seen in plan view in addition to the portion facing the load beam 21.

The line portions 41 comprise protrusion portions 41a which protrude toward the first damper material 80 and the second damper material 90, respectively. These protrusion portions 41a and the damper materials 80 and 90 are arranged so as to be spaced apart from each other in the width direction Y.

Figure 7:
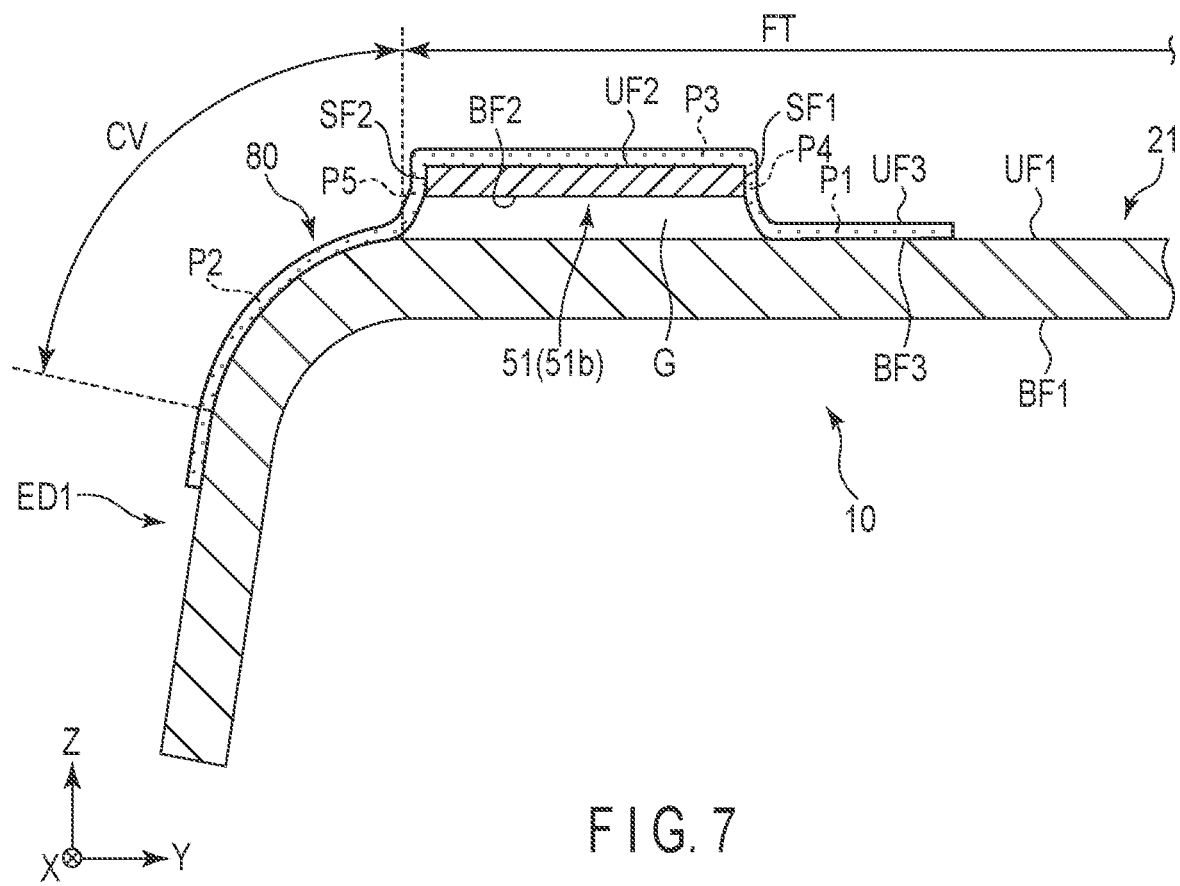
FIG. 7 is a schematic cross-sectional view of the suspension along the F7-F7 line of FIG. 5.

FIG. 7 is a schematic cross-sectional view of the suspension 10 along the F7-F7 line of FIG. 5. The first outrigger 51 (first proximal end arm 51b) comprises a lower surface BF2 (third surface) at least partially facing the upper surface UF1 of the load beam 21, an upper surface UF2 (fourth surface) on the opposite side of the lower surface BF2, and a pair of side surfaces SF1 and SF2 connecting the lower surface BF2 and the upper surface UF2. The first damper material 80 comprises a lower surface BF3 (fifth surface) facing the upper surfaces UF1 and UF2, and an upper surface UF3 (sixth surface) on the opposite side of the lower surface BF3.

The upper surface UF1 includes a flat surface FT ranging over a large part of the load beam 21, and a curved surface CV formed by bending the edge portion ED1. Like the section of FIG. 7, a gap G is formed between the load beam 21 and the first proximal end arm 51b at least in part of the area in which the load beam 21, the first outrigger 51 and the first damper material 80 overlap each other in the thickness direction Z. In this area, the gap G may not be formed, and the load beam 21 may be in contact with the first proximal end arm 51b as a whole.

The first damper material 80 has a single-layer structure of a viscoelastic material. In other words, the first damper material 80 of the present embodiment does not comprise a constrained plate. For the viscoelastic material, a material which has viscosity and can exert viscous resistance when it is deformed, such as a polymeric material of acrylic resin, etc., can be used.

In the example of FIG. 7, the thickness of the first damper material 80 is less than that of the load beam 21 and that of the first proximal end arm 51b. By this configuration, the followability of the first damper material 80 for the portion to which the first damper material 80 is attached is enhanced. However, to satisfactorily obtain the effect of preventing oscillation, the thickness of the first damper material 80 should be preferably greater than or equal to 10 μm. The thickness of the first damper material 80 may be greater than or equal to that of the load beam 21 and that of the first proximal end arm 51*b*.

The lower surface BF3 of the first damper material 80 is attached to the upper surface UF1 of the load beam 21 and the upper surface UF2 of the first proximal end arm 51*b* by the viscosity of the lower surface BF3. Further, the lower surface BF3 is attached to at least one of the side surfaces SF1 and SF2 of the first proximal end arm 51*b*, in the example of FIG. 7, to both of them.

More specifically, the first damper material 80 comprises a first portion P1 attached to the flat surface FT, a second portion P2 attached to the curved surface CV, a third portion P3 attached to the first proximal end arm 51*b*, a fourth portion P4 attached to the side surface SF1 and a fifth portion P5 attached to the side surface SF2.

In the example of FIG. 7, the third portion P3 is located between the first portion P1 and the second portion P2. Further, the fourth portion P4 is located between the first portion P1 and the third portion P3, and the fifth portion P5 is located between the second portion P2 and the third portion P3. In part of the fourth portion P4 and the fifth portion P5, the lower surface BF3 is exposed to the gap G.

The upper surface UF3 of the first damper material 80 is not in contact with the other members. Thus, the upper surface UF3 is exposed to the atmosphere around the first damper material 80 as a whole. In other words, the upper surface UF3 is in contact with an air layer as a whole.

In the example of FIG. 7, the lower surface BF2 of the first proximal end arm 51*b* is not in contact with the first damper material 80. It should be noted that the first damper material 80 may be attached to part of the lower surface BF2. For example, as shown in FIG. 5, when the first damper material 80 is also attached to, of the first proximal end arm 51*b*, the portion which protrudes to the outside of the edge portion ED1, the first damper material 80 could be attached to the lower surface BF2 in this portion.

The cross-sectional structure including the second damper material 90 and the second outrigger 52 (the second proximal end arm 52*b*) is similar to the cross-sectional structure including the first damper material 80 and the first outrigger 51 in FIG. 7. Thus, the second damper material 90 also has a single-layer structure of a viscoelastic material.

This specification hereinafter explains the effect of the suspension 10 according to the embodiment.

In the suspension 10 of the present embodiment, the first outrigger 51 and the second outrigger 52 are attached to the load beam 21 by the first damper material 80 and the second damper material 90, respectively. When energy for oscillating the flexure 22 is input from outside, the oscillation energy is transmitted to these damper materials 80 and 90. At this time, the damper materials 80 and 90 which are viscoelastic materials deform, and internal resistance is generated by the friction of the molecules constituting the viscoelastic materials. Thus, the oscillation energy is converted into heat energy, thereby preventing the oscillation of the flexure 22.

Figure 8:
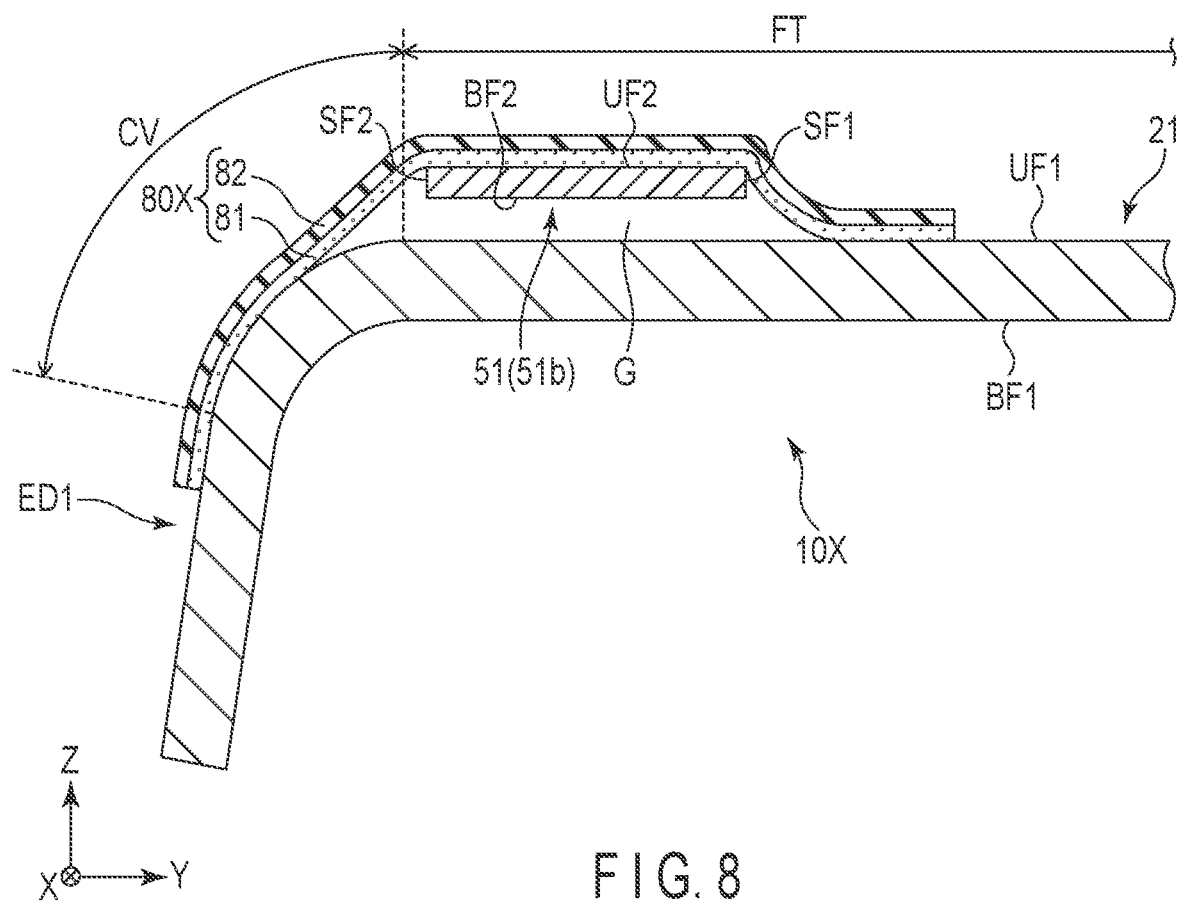
FIG. 8 is a schematic cross-sectional view of a suspension according to a comparative example.

FIG. 8 is a schematic cross-sectional view of a suspension 10X according to a comparative example. This cross-sectional view includes a load beam 21, a first outrigger 51 (first proximal end arm 51*b*) and a damper material 80X in a manner similar to that of FIG. 7.

In the suspension 10X, the damper material 80X comprises a viscoelastic material 81 and a constrained plate 82. The viscoelastic material 81 is attached to the upper surface UF1 of the load beam 21 and the upper surface UF2 of the first outrigger 51. The constrained plate 82 is formed of a material which is more rigid than the viscoelastic material 81, and entirely covers the viscoelastic material 81.

The damper material 80X comprising the constrained plate 82 in this manner is difficult to deform compared to the first and second damper materials 80 and 90 of the present embodiment. In addition, it is difficult to apply a fine bending process to the damper material 80X compared to the first and second damper materials 80 and 90 of the present embodiment. Thus, the damper material 80X is difficult to cover side surfaces SF1 and SF2. Further, it is difficult to attach the damper material 80X to a portion which is not flat, such as a curved surface CV.

To the contrary, as the first damper material 80 and the second damper material 90 in the present embodiment have a single-layer structure of a viscoelastic material, they exert a high deformation property. Thus, the first damper material 80 and the second damper material 90 can be satisfactorily attached to the side surfaces SF1 and SF2 of the first outrigger 51 and the second outrigger 52 and the curved surfaces CV of the edge portions ED1 and ED2. When the first damper material 80 and the second damper material 90 are attached to a wide range of the side surfaces SF1 and SF2 and the curved surfaces CV, the effect of preventing the oscillation of the flexure 22 is enhanced.

In this way, as the first damper material 80 and the second damper material 90 can be attached to a place in which the change in undulation is large, the number of choices of the attachment position is increased. Thus, the first damper material 80 and the second damper material 90 can be attached to positions which are suitable for the prevention of the oscillation of the flexure 22 regardless of the undulation of the attachment positions. As a result, it is possible to realize the good rigidity of the flexure 22 while minimizing the attachment areas of the first damper material 80 and the second damper material 90 and effectively preventing the oscillation of the flexure 22.

In the present embodiment, of the load beam 21, the portions to which the first damper material 80 and the second damper material 90 are attached substantially have the same role as a constrained plate. Thus, it is possible to favorably obtain the effect of preventing the oscillation of the flexure 22 compared to the suspension 10X of the comparative example.

The upper surfaces of the first damper material 80 and the second damper material 90 are exposed to the surrounding atmosphere. These exposed upper surfaces could absorb particles in the case 2 in a state where the suspension 10 is mounted on the disk drive 1. This configuration prevents the problems caused to the disk drive 1 by particles, thereby improving the reliability of the disk drive 1.

The inventor investigated the effect of preventing the oscillation of the flexure 22 by the first damper material 80 and the second damper material 90. The structure of the suspension 10 in this investigation is the same as the structure shown in FIG. 3 to FIG. 7.

Figure 9:
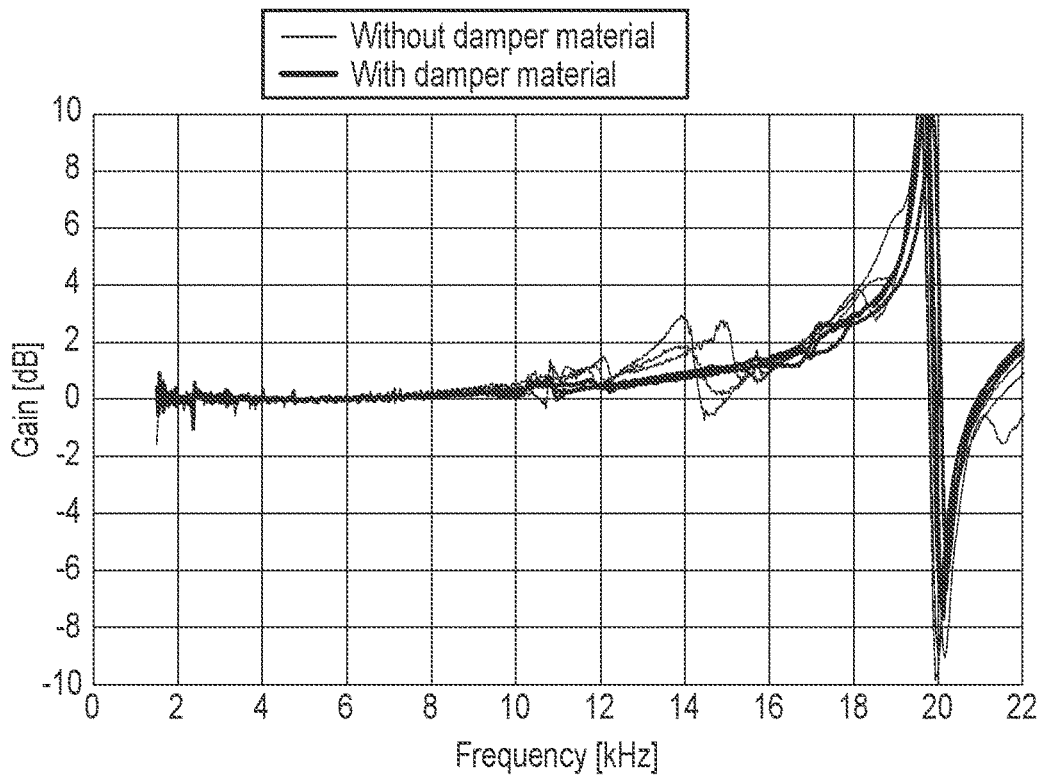
FIG. 9 is a graph showing the result of evaluation of the difference in oscillation property depending on whether or not a damper material is provided.

FIG. 9 is a graph showing the result of evaluation of the difference in oscillation property depending on whether or not the first and second damper materials 80 and 90 are provided. In the graph, the horizontal axis indicates the frequency [kHz], and the vertical axis indicates the gain [dB]. In the graph, a plurality of narrow lines indicate the results of measurement of some samples of suspensions which comprise neither the first damper material 80 nor the second damper material 90. In the graph, a plurality of wide lines indicate the results of measurement of some samples of suspensions 10 comprising the first damper material 80 and the second damper material 90.

In the graph of FIG. 9, the gain of each suspension which comprises neither the first damper material 80 nor the second damper material 90 largely increases and decreases near 14 kHz, etc., and largely differs from sample to sample. To the contrary, the gain of each suspension 10 comprising the first damper material 80 and the second damper material 90 is stable overall, and does not largely differ from sample to sample. These results show that the oscillation of the flexure 22 can be effectively prevented by providing the first damper material 80 and the second damper material 90.

Figure 10:
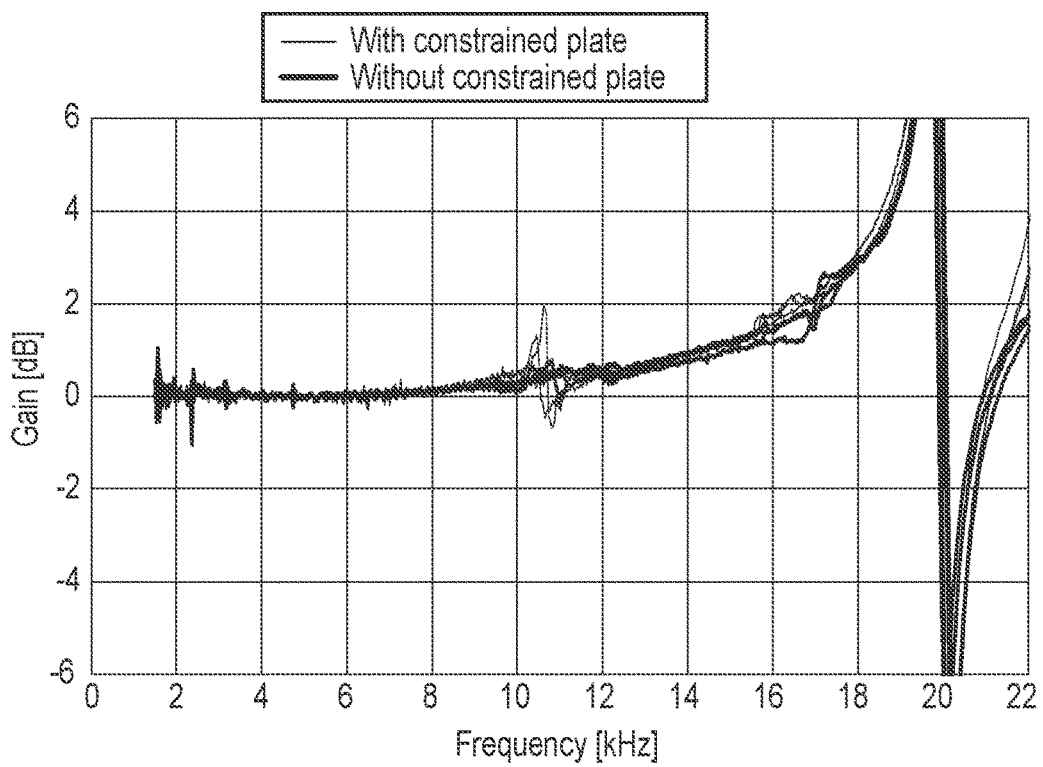
FIG. 10 is a graph showing the result of evaluation of the difference in oscillation property depending on whether or not a constrained plate is provided in the damper material.

FIG. 10 is a graph showing the result of evaluation of the difference in oscillation property depending on whether or not a constrained plate is provided. In the graph, the horizontal axis indicates the frequency [kHz], and the vertical axis indicates the gain [dB]. In the graph, a plurality of narrow lines indicate the results of measurement of some samples of suspensions which comprise the first and second damper materials including constrained plates like the damper material 80X shown in FIG. 8. In the graph, a plurality of wide lines indicate the results of measurement of some samples of suspensions 10 comprising the first damper material 80 and the second damper material 90 without a constrained plate.

The graph of FIG. 10 shows that the gain is stabilized overall in both a case where each damper material includes a constrained plate and a case where each damper material does not include a constrained plate. It is also confirmed that, when the damper materials do not include a constrained plate, the oscillation of 10 to 12 kHz is more effectively prevented than a case where the damper materials include a constrained plate.

The above investigation confirms that the suspension 10 comprising the first damper material 80 and the second damper material 90 like the present embodiment satisfactorily exerts the effect of preventing the oscillation of the flexure 22.

Second Embodiment

A second embodiment is explained. The present embodiment is different from the first embodiment in terms of the position to which a first damper material 80 and a second damper material 90 are attached. The explanation of a configuration similar to that of the first embodiment is omitted.

Figure 11:
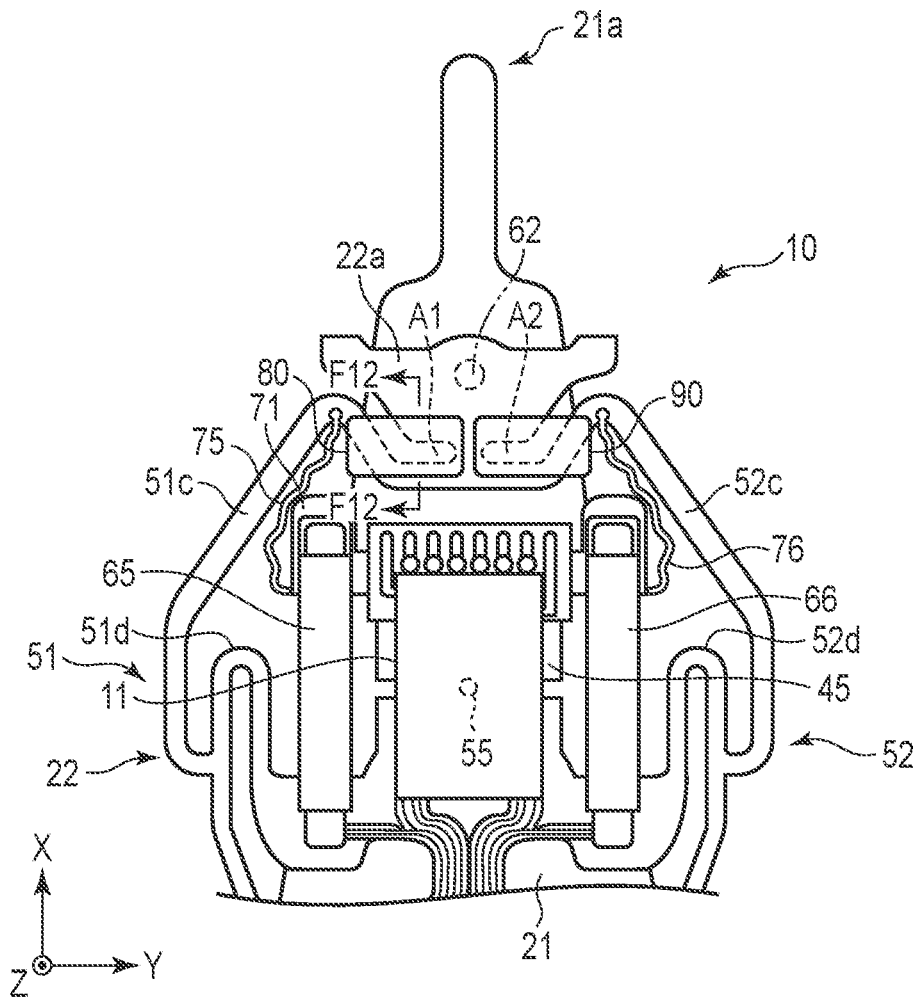
FIG. 11 is a schematic plan view showing part of a suspension according to a second embodiment.

FIG. 11 is a schematic plan view showing part of a suspension 10 according to the second embodiment. In the example of FIG. 11, the first damper material 80 is attached to a first distal end arm 51c, the distal end portion 22a of a flexure 22, and of a load beam 21, an area A1 located between the first distal end arm 51c and the distal end portion 22a as seen in plan view. The second damper material 90 is attached to a second distal end arm 52c, the distal end portion 22a, and of the load beam 21, an area A2 located between the second distal end arm 52c and the distal end portion 22a as seen in plan view.

Figure 12:
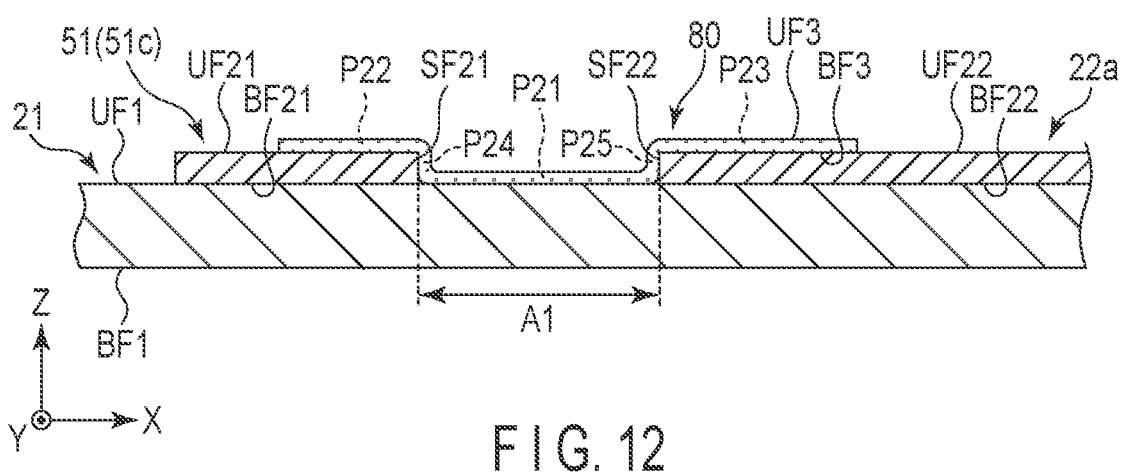
FIG. 12 is a schematic cross-sectional view of the suspension along the F12-F12 line of FIG. 11.

FIG. 12 is a schematic cross-sectional view of the suspension 10 along the F12-F12 line of FIG. 11. A first outrigger 51 (first distal end arm 51c) comprises a lower surface BF21 at least partially facing the upper surface UF1 of the load beam 21, an upper surface UF21 on the opposite side of the lower surface BF21, and a side surface SF21 connecting the lower surface BF21 and the upper surface UF21. The distal end portion 22a comprises a lower surface BF22 at least partially facing the upper surface UF1 of the load beam 21, an upper surface UF22 on the opposite side of the lower surface BF22, and a side surface SF22 connecting the lower surface BF22 and the upper surface UF22. The side surfaces SF21 and SF22 face each other.

In the example of FIG. 12, both of the lower surfaces BF21 and BF22 are in contact with the upper surface UF1. As another example, a gap may be formed between at least one of the lower surfaces BF21 and BF22 and the upper surface UF1.

The lower surface BF3 of the first damper material 80 is attached to the upper surfaces UF21 and UF22 and is also attached to the upper surface UF1 in the area A1. Further, the lower surface BF3 is attached to at least one of the side surfaces SF21 and SF22, in the example of FIG. 12, to both of them.

More specifically, the first damper material 80 comprises a first portion P21 attached to the upper surface UF1, a second portion P22 attached to the upper surface UF21, a third portion P23 attached to the upper surface UF22, a fourth portion P24 attached to the side surface SF21, and a fifth portion P25 attached to the side surface SF22. In the example of FIG. 12, the first portion P21 is located between the second portion P22 and the third portion P23. The upper surface UF3 of the first damper material 80 is not in contact with the other members in the same manner as the first embodiment.

The cross-sectional structure including the second damper material 90 and a second outrigger 52 (second distal end arm 52c) is similar to the cross-sectional structure including the first damper material 80 and the first outrigger 51 in FIG. 12. In the example of FIG. 11, the first damper material 80 is spaced apart from the second damper material 90. However, these damper materials 80 and 90 may consist of a single continuous viscoelastic material.

If a damper material including a viscoelastic material and a constrained plate is provided so as to cover tiny gaps (slits provided in the flexure 22) between the distal end portion 22a and the first distal end arm 51c and between the distal end portion 22a and the second distal end arm 52c, as the damper material is difficult to deform, there is a possibility that the viscoelastic material is not attached to the upper surface UF1 of the load beam 21 in the area A1 or A2. To the contrary, the first and second damper materials 80 and 90 having a single-layer structure of a viscoelastic material in the present embodiment can be satisfactorily attached to the upper surface UF1 and the side surfaces SF21 and SF22 in the areas A1 and A2.

Third Embodiment

A third embodiment is explained. The present embodiment is different from the above embodiments in terms of the form of attaching a first damper material 80 and a second damper material 90. The explanation of a configuration similar to that of the above embodiments is omitted.

Figure 13:
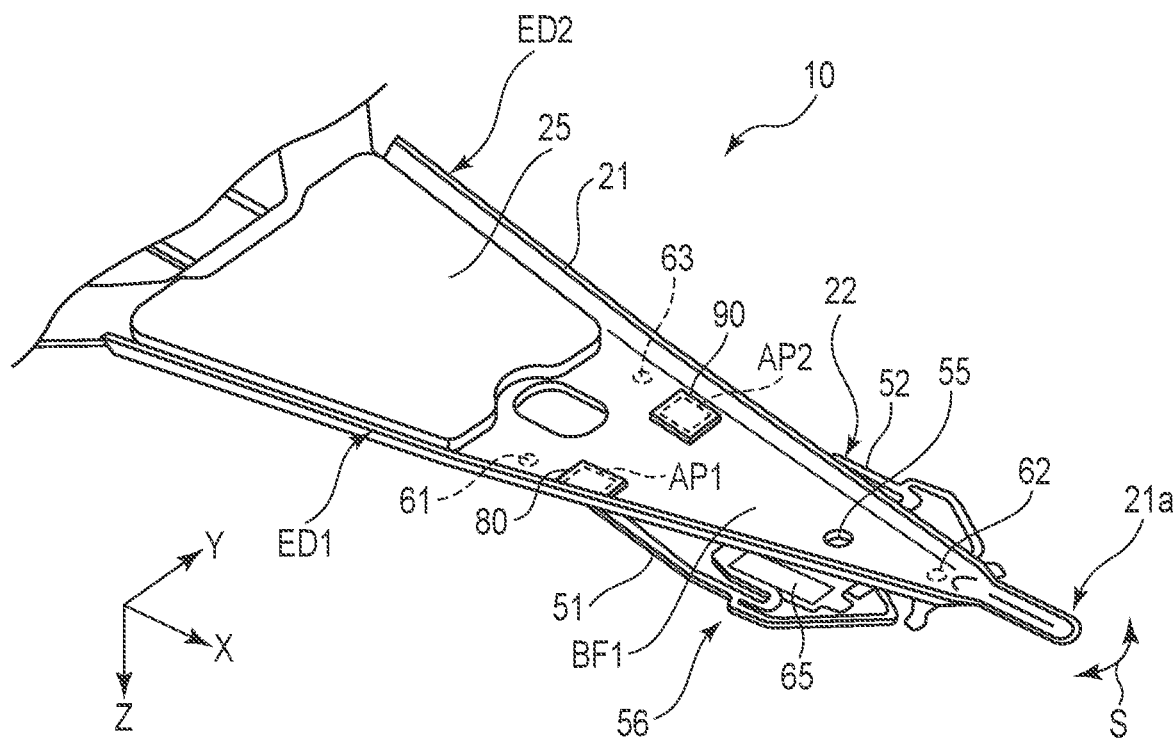
FIG. 13 is a schematic perspective view of a suspension 10 according to a third embodiment.

FIG. 13 is a schematic perspective view of a suspension 10 according to the third embodiment. In the present embodiment, a load beam 21 comprises a first aperture AP1 and a second aperture AP2. The first damper material 80 is attached to the lower surface BF1 of the load beam 21 and overlaps the first aperture AP1. The second damper material 90 is attached to the lower surface BF1 and overlaps the second aperture AP2.

In the example of FIG. 13, the first damper material 80 blocks the entire first aperture AP1, and the second damper material 90 blocks the entire second aperture AP2. As another example, the first damper material 80 and the second damper material 90 may block only part of the first aperture AP1 and the second aperture AP2, respectively.

Figure 14:
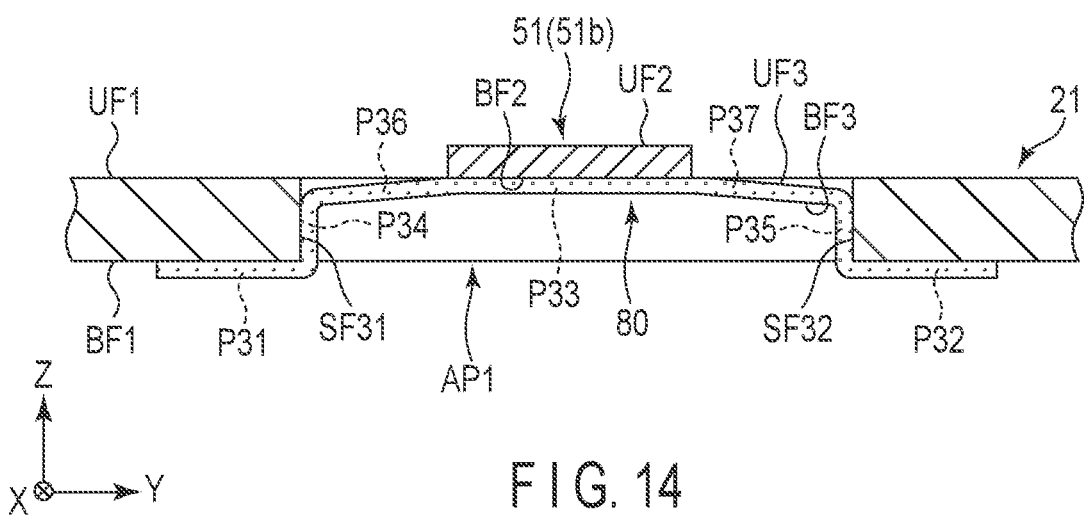
FIG. 14 is a schematic cross-sectional view of the suspension according to the third embodiment.

FIG. 14 is a schematic cross-sectional view of the suspension 10 in an area including the first damper material 80 and the first aperture AP1. The first aperture AP1 penetrates the area between the lower surface BF1 and an upper surface UF1. The load beam 21 comprises a pair of side surfaces SF31 and SF32 facing each other in the first aperture AP.

In FIG. 14, part of the first proximal end arm 51b of a first outrigger 51 (for example, a first bent portion 51e) overlaps the first aperture AP1. For example, the first proximal end arm 51b crosses the first aperture AP1 in the length direction X.

The upper surface UF3 of the first damper material 80 is attached to the lower surface BF1 of the load beam 21 and the lower surface BF2 of the first proximal end arm 51b by the viscosity of the upper surface UF3. Further, the upper surface UF3 is attached to at least one of the side surfaces SF31 and SF32, in the example of FIG. 14, to both of them.

More specifically, the first damper material 80 comprises first and second portions P31 and P32 attached to the lower surface BF1, a third portion P33 attached to the lower surface BF2, a fourth portion P34 attached to the side surface SF31, and a fifth portion P35 attached to the side surface SF32. The first damper material 80 further comprises sixth and seventh portions P36 and P37 in which a lower surface BF3 or the upper surface UF3 is not attached to any member.

In the example of FIG. 14, the third portion P33 is located between the first portion P31 and the second portion P32, and the fourth portion P34 is located between the first portion P31 and the third portion P33, and the fifth portion P35 is located between the second portion P32 and the third portion P33. Moreover, the sixth portion P36 is located between the third portion P33 and the fourth portion P34, and the seventh portion P37 is located between the third portion P33 and the fifth portion P35.

The lower surface BF3 of the first damper material 80 is not in contact with the other members. Thus, the lower surface BF3 is exposed to the atmosphere around the first damper material 80 as a whole. In other words, the lower surface BF3 is in contact with an air layer as a whole.

The cross-sectional structure including the second damper material 90, the second aperture AP2 and a second outrigger 52 (a second proximal end arm 52b) is similar to the cross-sectional structure including the first damper material 80, the first aperture AP1 and the first outrigger 51 in FIG. 14. In the example of FIG. 13, the first damper material 80 is spaced apart from the second damper material 90. However, these damper materials 80 and 90 may consist of a single continuous viscoelastic material.

If a damper material including a viscoelastic material and a constrained plate is attached to the first proximal end arm 51b and the second proximal end arm 52b through the first aperture AP1 and the second aperture AP2, as the damper material is difficult to deform, there is a possibility that the viscoelastic material is not attached to the proximal end arm 51b or 52b. To the contrary, as the first and second damper materials 80 and 90 having a single-layer structure of a viscoelastic material in the present embodiment exert a high deformation property, they can be satisfactorily attached to the first proximal end arm 51b and the second proximal end arm 52b through the first aperture AP1 and the second aperture AP2.

In the example of FIG. 14, the first damper material 80 is directly attached to the first proximal end arm 51b. However, a spacer may be provided between the first damper material 80 and the first proximal end arm 51b. Similarly, a spacer may be provided between the second damper material 90 and the second proximal end arm 52b. In this structure, the amount of deformation of the first damper material 80 and the second damper material 90 can be suppressed. Thus, it is possible to more satisfactorily attach the damper materials 80 and 90 to the first proximal end arm 51b and the second proximal end arm 52b, respectively.

The first proximal end arm 51b may be bent in the thickness direction Z near the first aperture AP1, and part of the first proximal end arm 51b may be located inside the first aperture AP1. Similarly, the second proximal end arm 52b may be bent in the thickness direction Z near the second aperture AP2, and part of the second proximal end arm 52b may be located inside the second aperture AP2. In this structure, similarly, the amount of deformation of the first damper material 80 and the second damper material 90 can be suppressed. Thus, it is possible to more satisfactorily attach the damper materials 80 and 90 to the first proximal end arm 51b and the second proximal end arm 52b, respectively.

When the invention disclosed in each of the above embodiments is implemented, the specific forms of each of the elements constituting the disk drive suspension, such as the specific forms including the shapes of the load beam and the flexure and the positions of the first damper material and the second damper material, may be modified in various ways. For example, the first damper material 80 and the second damper material 90 similar to those of each embodiment may be provided in a suspension which does not comprise the microactuator element 65 or 66.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A disk drive suspension comprising:
a load beam;
a flexure comprising a tongue on which a slider is to be mounted, and an outrigger connected to the tongue, the flexure overlapping the load beam; and
a damper material attached to the load beam and the outrigger,
wherein:
the damper material has a single-layer structure of a viscoelastic material,
the load beam comprises a first surface and a second surface on an opposite side of the first surface,
the outrigger comprises a third surface at least partially facing the second surface, a fourth surface on an opposite side of the third surface, and a side surface connecting the third surface and the fourth surface, and
the damper material is attached to each of the second surface, the fourth surface and the side surface.
2. The disk drive suspension of claim 1, wherein:
the second surface includes a curved surface formed in an edge portion of the load beam, and
the damper material is attached to the curved surface.
3. The disk drive suspension of claim 2, wherein the damper material is provided at a position at which the outrigger and the edge portion intersect as seen in plan view.
4. A disk drive suspension comprising:
a load beam;

a flexure comprising a tongue on which a slider is to be mounted, and an outrigger connected to the tongue, the flexure overlapping the load beam; and a damper material attached to the load beam and the outrigger, wherein:

the damper material has a single-layer structure of a viscoelastic material, the flexure comprises a distal end portion secured to the load beam, and the damper material is attached to the outrigger and the distal end portion, and is also attached to, of the load beam, an area located between the outrigger and the distal end portion as seen in plan view.

5. A disk drive suspension comprising:

a load beam;

a flexure comprising a tongue on which a slider is to be mounted, and an outrigger connected to the tongue, the flexure overlapping the load beam; and a damper material attached to the load beam and the outrigger, wherein:

the damper material has a single-layer structure of a viscoelastic material, the damper material comprises a fifth surface attached to the load beam and the outrigger, and a sixth surface on an opposite side of the fifth surface, and the sixth surface is exposed to atmosphere around the damper material.

6. The disk drive suspension of claim 1, wherein:

a gap is formed between the outrigger and the load beam at least in part of an area in which the load beam, the outrigger and the damper material overlap each other.

7. The disk drive suspension of claim 5, wherein:

the load beam comprises a first surface, and a second surface on an opposite side of the first surface, the outrigger comprises a third surface at least partially facing the second surface, and a fourth surface on an opposite side of the third surface, and the damper material is attached to each of the first surface and the third surface.

8. The disk drive suspension of claim 7, wherein:

the load beam comprises an aperture which penetrates between the first surface and the second surface, and the damper material is attached to the third surface through the aperture.

\* \* \* \* \*